Aug. 22, 1944.  B. G. DAGGETT  2,356,448
POWER SAW SETTING APPARATUS
Filed June 13, 1941  4 Sheets-Sheet 1

INVENTOR:
BYRON G. DAGGETT,
BY
ATTORNEY

Aug. 22, 1944.   B. G. DAGGETT   2,356,448
POWER SAW SETTING APPARATUS
Filed June 13, 1941   4 Sheets-Sheet 2
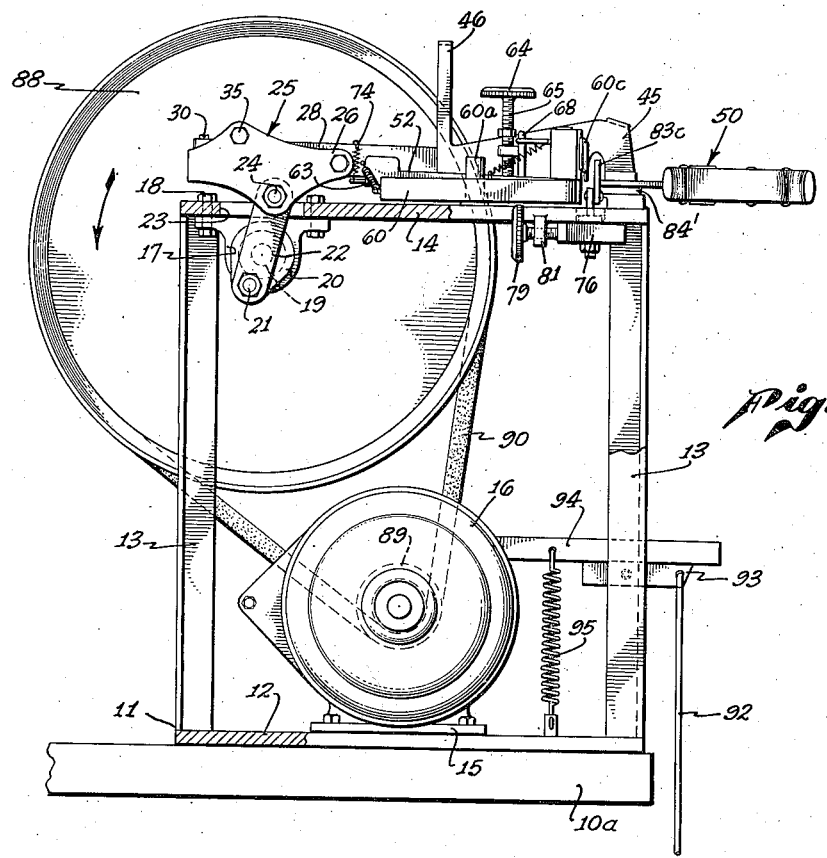
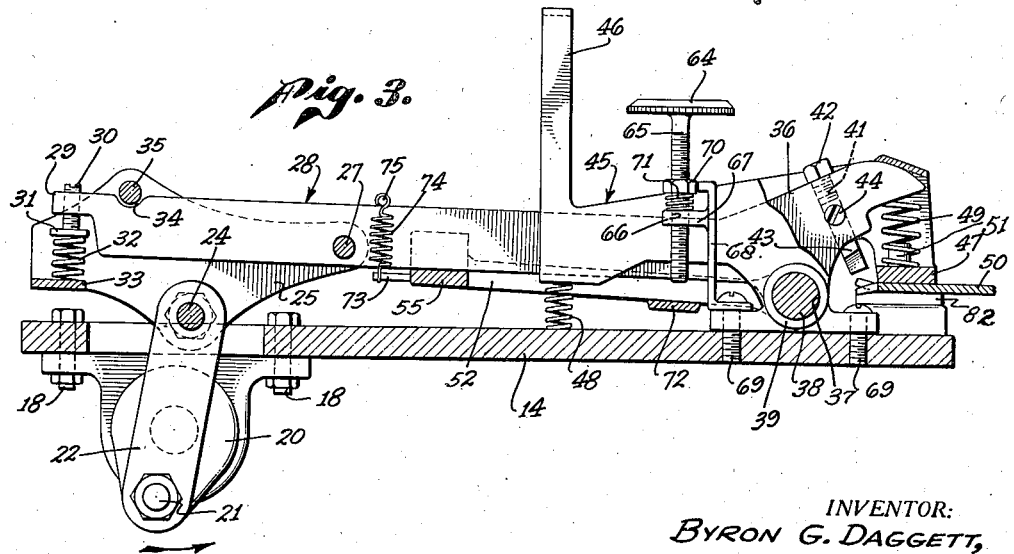
INVENTOR:
BYRON G. DAGGETT,
BY Everett N. Curtis
ATTORNEY

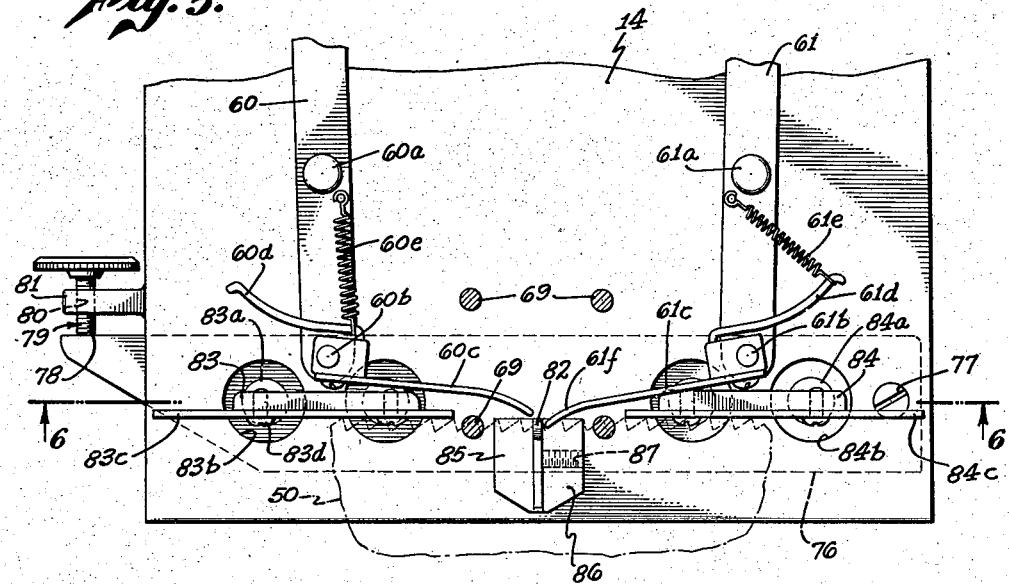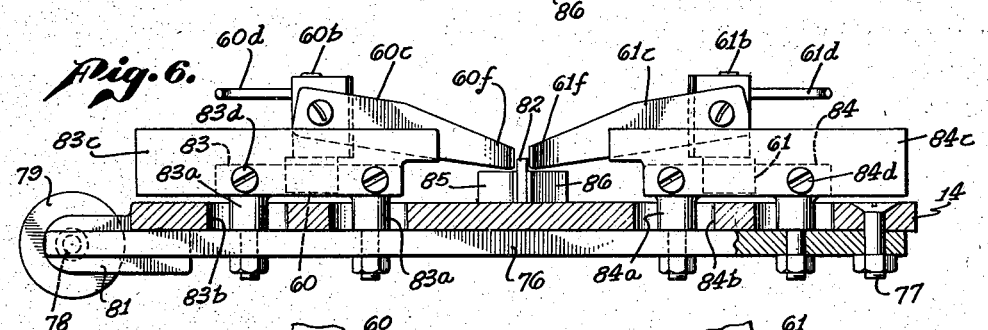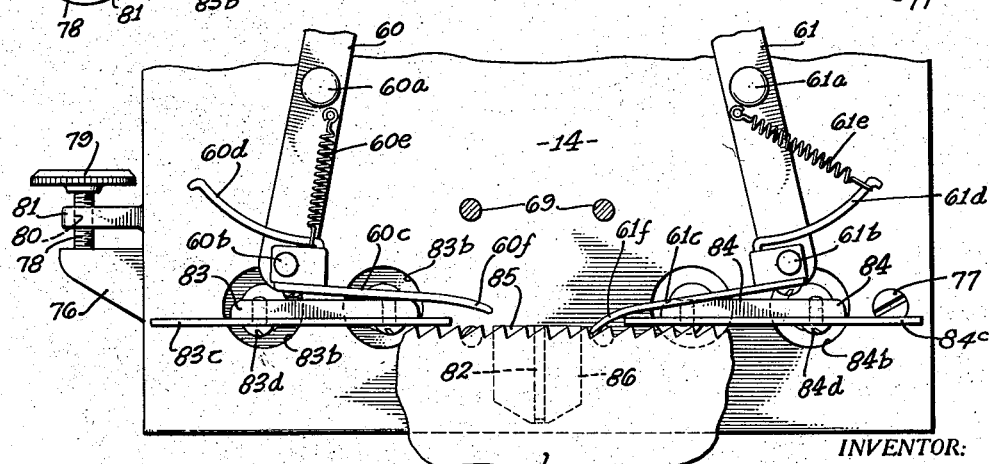

Aug. 22, 1944.  B. G. DAGGETT  2,356,448
POWER SAW SETTING APPARATUS
Filed June 13, 1941   4 Sheets-Sheet 4
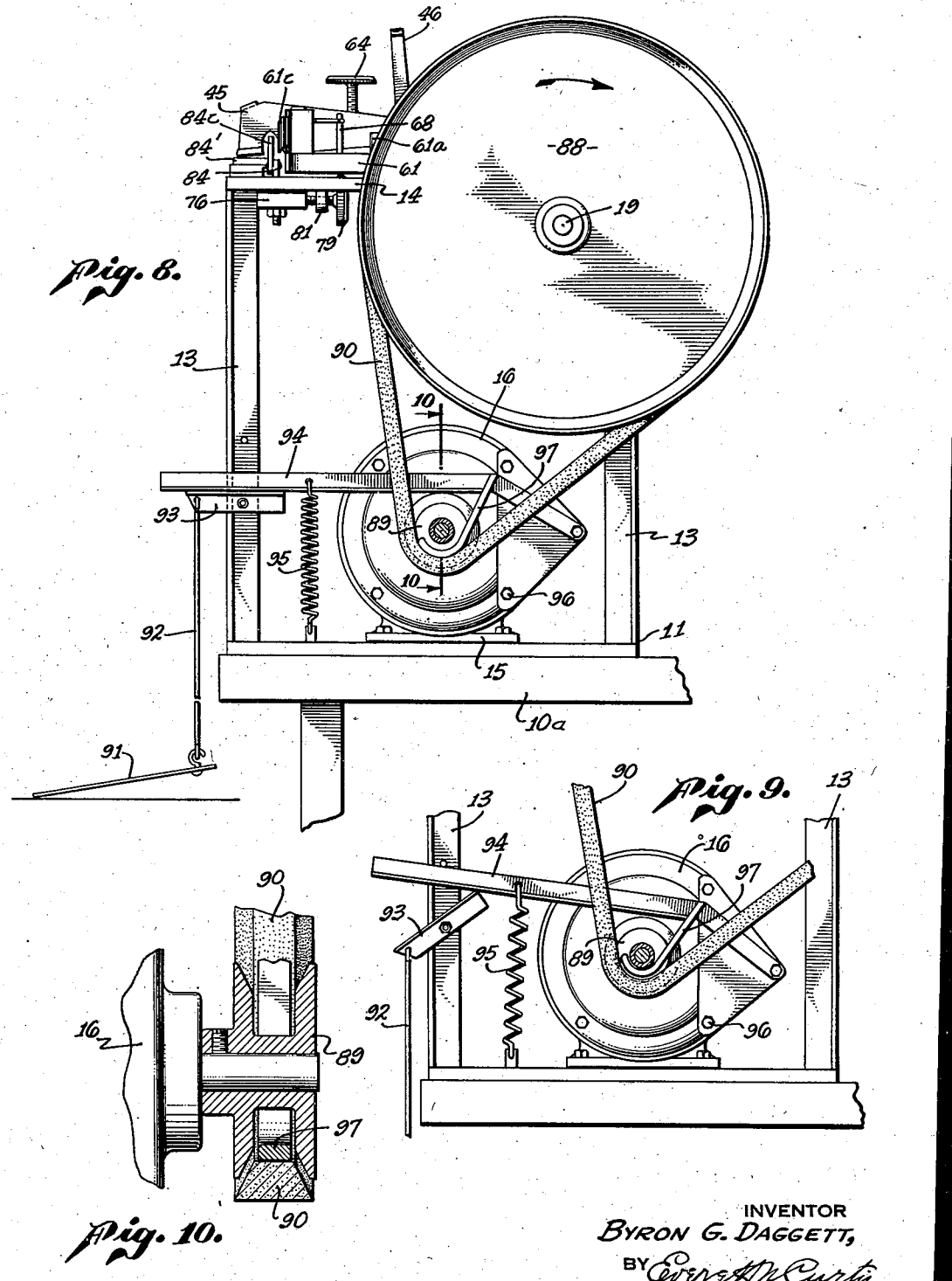
INVENTOR
BYRON G. DAGGETT,
BY
ATTORNEY.

Patented Aug. 22, 1944

2,356,448

UNITED STATES PATENT OFFICE 2,356,448

POWER SAW SETTING APPARATUS

Byron G. Daggett, San Diego, Calif.

Application June 13, 1941, Serial No. 397,905

6 Claims. (Cl. 76—62)

My invention relates to power saw setting apparatus, particularly apparatus for quickly resetting the teeth of hand saws with precision and accuracy, and its objects are to obtain by mechanical means greater accuracy in bringing about the uniform set or reset of alternate teeth of a used hand saw in their required alignment and at the same time to secure such result with all possible speed; to render automatic the setting of alternate teeth of the saw in accurate alignment; to permit ready inspection, replacement and repair of the several parts, and generally to simplify and render more effective the operation of the various elements of my invention. Other objects will appear from an inspection of the drawings and as hereinafter described and claimed.

Prior to the required sharpening of the set teeth of a saw which has become dulled through customary use, it is generally recognized that such teeth must be accurately reset so far as possible in their original alignment. Through the conditions of actual use, the original set is diminished and impaired and as a result variations in straightness of the saw toothed edge will occur and some of the teeth of such saw inevitably will become forced out of such alignment, and must be reset in proper alignment in order to give free running clearance and to register accurately with the sharpening instrument of any mechanical saw sharpener employed for the purpose, and to prevent the undue cutting away of edges of the teeth or impairment thereof likely to be brought about through such displacement. I know that attempts have been made to construct machines for the setting of handsaws, but, among other absent novel features of my invention, so far as I am aware no practicable provision has been made in such machines to secure absolute uniformity of the set despite undulations or variations in the depth of the linear extending edge of the saw teeth. Through the use of my apparatus however, any such variation or displacement is immediately and efficiently corrected by mechanical means and the original set restored speedily automatically and completely.

Attention is hereby directed to the drawings, illustrating a preferred form of my invention, in which similar numerals of designation refer to similar parts throughout the several views, and in which, Figure 1 is a plan view of my apparatus, showing a hand saw in operative position for setting of teeth;

Figure 2 is a side elevation of the apparatus shown in Figure 1, looking at the same from the left;

Figure 3 is an enlarged section partly in elevation on line 3—3 of Figure 1, looking in the direction of the arrows, and illustrating the main operative parts of my invention located just above and adjacent the top or table of my apparatus, the setting jaw being shown in raised position;

Figure 5 is an enlarged plan view of the parts of the apparatus immediately adjacent to the teeth of the saw and used for advancing the same by application of one of the fingers to each alternate tooth, adjacent parts being shown removed for the purpose of better illustration;

Figure 6 is a section on line 6—6 of Figure 5, looking in the direction of the arrows;

Figure 7 is an enlarged plan view similar to that set forth in Figure 5, showing one of the feed fingers in retracted position ready to move the next alternate tooth into setting position;

Figure 8 is a view in elevation of the part of my apparatus immediately adjacent to the pulley and belt connections to the motor, showing the starting and stopping mechanism in neutral position;

Figure 9 is a view of the pulley and adjacent parts shown in Figure 8, showing the pulley belt in operative connection with the motor, and Figure 10 is a section on line 10—10 of Figure 8, looking in the direction of the arrows.

Figure 1:
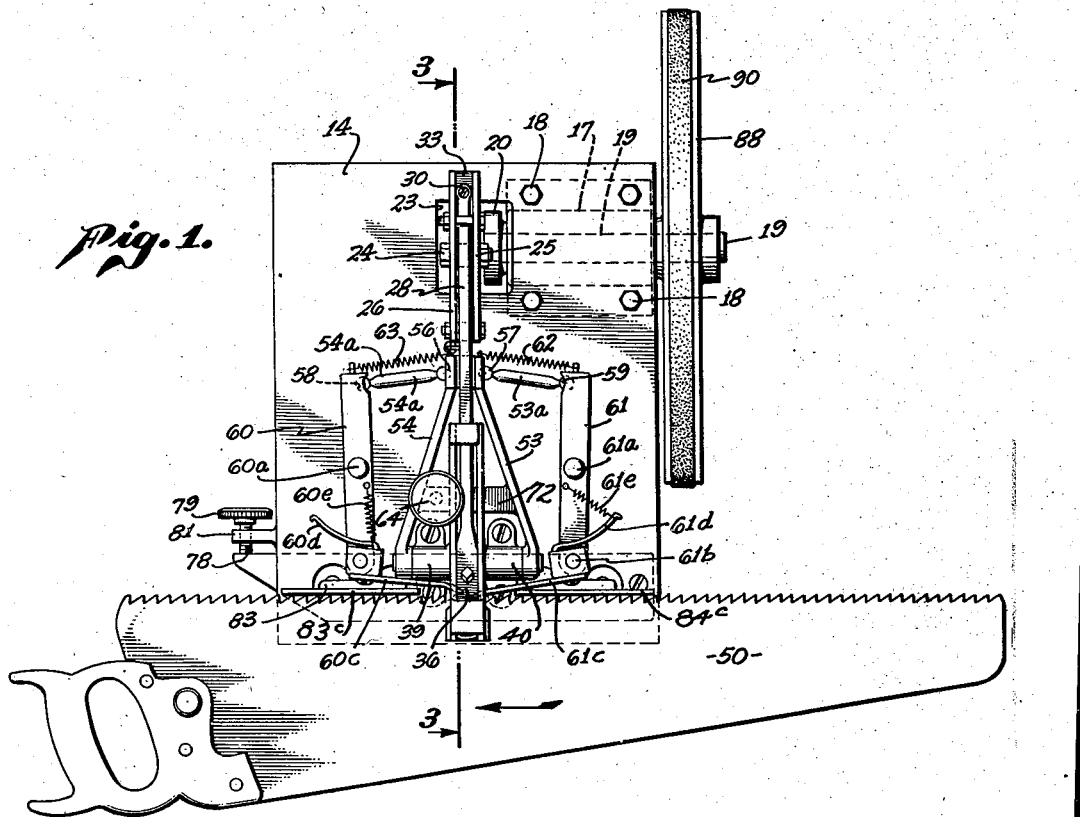

Referring to the drawings, upon the top of a bench or table, 10a is placed in convenient operative position the frame 11 of my improved apparatus, having the bottom plate 12, uprights 13 and the top plate 14, all of which are preferably constructed of metal and of one integral piece or are welded together. To the bottom plate 12 is adjustably secured the base 15 of the motor 16, the said base being provided with the usual securing slots and bolts employed for the purpose (not shown).

To the underside of the top plate 14 is secured the bearing 17 by means of the bolts 18, and within said bearing is journalled the shaft 19, upon the inner side of which is mounted the eccentric 20, provided with the crank rod 22, the other end of which rod extends upwardly through the opening 23 in the top plate 14, and is pivotally connected to the wrist pin 24, extending through and secured to the arms 26 of the yoke 25.

To the ends of the arms 26 of said yoke, by means of the bolt 27, is pivotally secured the walking beam 28, the outer end of which terminates in a lip 29 provided with an adjusting screw 30, having a head 31 contacting with the compression spring 32 which rests upon the bow strip 33 connecting said arms. Preferably the said outer end is also provided with the depression 34 arranged to engage with the stop 35, which extends through and is mounted upon said arms 26. The inner end of the said walking beam 28 terminates in the jaw 36, and is provided with an opening 37 through which passes the shaft 38 whose ends are journalled in bearings 39 and 40 mounted upon the top plate 14, and secured thereto by the screws 69. Through the jaw 36, downwardly extends the opening 41, the upper part of which is threaded to engage with the threaded shank of the adjusting screw 42, and the lower part of which is square in cross section and is shaped to engage with the square shank of the setting plunger 43, normally held in place by the set screw 44. Located immediately beneath the said plunger 43 is the anvil 82, which is normally held rigidly between the blocks 85 and 86 welded to the plate 14; a set screw 87, extending through a threaded opening in the block 86 and contacting with one face of said anvil, serving to maintain the same in operative position.

Figure 4:
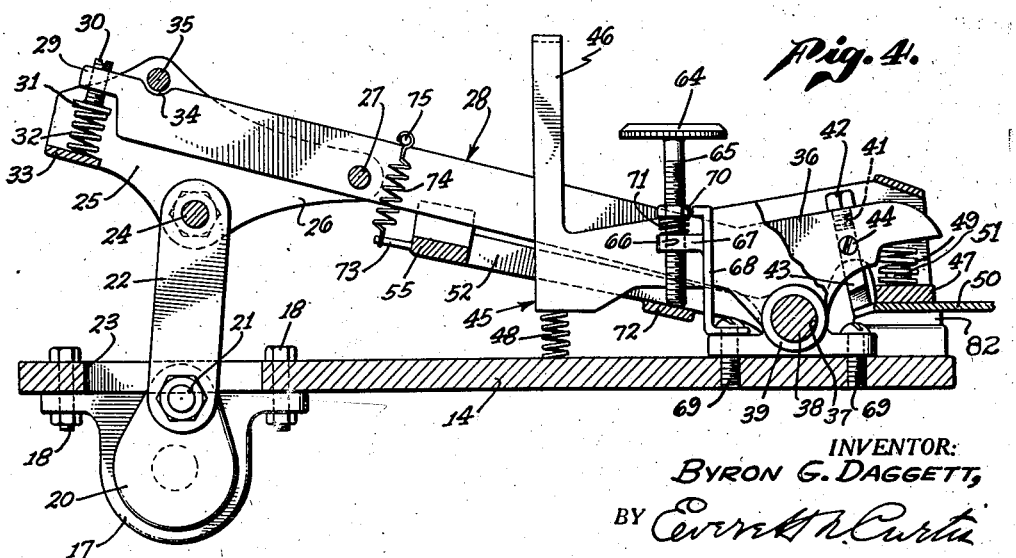
Figure 4 is an enlarged section partly in elevation similar to that set forth in Figure 3, the plunger of the setting jaw being shown in operative squeezing position for setting a tooth of the saw.

As will be observed from Figs. 3 and 4, the opposing parts of the setting plunger 43 and anvil 82 are shaped to receive, and to conform to the required set of the teeth when contacting therewith; the face of said anvil having a bevel at the side thereof registering with said set and the end of said plunger being conformed therewith. Also as will be seen in said drawings, the top of the anvil 82 is extended beyond said conformation so as to receive and support the part of the saw blade adjacent to said teeth while the same are in position to be set.

In order to hold the blade and toothed edge of the saw 50 firmly in position while its teeth are being set, I preferably provide the presser foot 45, pivotally mounted upon the shaft 38 and having at one end the releasing handle 46, and at the other end the foot 47; the pressure spring 48 located between the handle 46 and top plate 14, being provided to normally hold with yielding pressure said presser foot in operative position in contact with the blade of said saw, and the pressure spring 49 being located between the jaw 36 and the foot 47 and engaging with and being held in place by the stud 51 on the top of said foot.

For the purpose of moving the teeth of the saw progressively from one alternate tooth to the next alternate tooth in alignment therewith, I preferably employ the special form of construction shown in the drawings, having the yoke 52 provided with the arms 53 and 54 connected by the bow strip 55, and having sockets 56 shaped to receive balls 57 upon the inner ends of spreaders 53a and 54a and to form ball and socket joints therewith, and the outer ends of said spreaders being similarly supplied with balls 59 engaging with sockets 58 in the oscillating members 60 and 61; tension springs 62 and 63 serving to secure and hold together the said members, adjacent to the said spreaders and the arms of the yoke 52, and to insure that the said ball and socket joints are kept in operative position. The members 60 and 61 are pivotally mounted upon the studs 60a and 61a secured to top plate 14, and are arranged to oscillate thereon. The said members are pivotally connected at their inner ends by studs 60b and 61b to feed fingers 60c and 61c, the inner ends 60f and 61f of which fingers are respectively curved so as to make contact when required with the adjacent teeth of the saw, and the outer ends 60d and 61d of which are slidingly connected with the tension springs 60e and 61e, respectively connected by pins to the members 60 and 61.

For the purpose of making the various adjustments required for feeding the teeth of the saw in the progressive steps required for setting, I provide the adjusting thumb screw 64, having a threaded shank 65 engaging with the threaded opening 66 in the ear 67 of the bracket 68, which is secured to the top plate 14 by one of the screws 69; the steady nut 70 upon the threaded shank of the screw 64, together with the compression spring 71 thereon, serving to hold the said screw 64 in operative position. As will be observed, the lower end of the screw 64 is located so as to contact with the web 72 connecting the arms 53 and 54 of the yoke 52. Forming part of the web 55 is the lip 73, which is connected by the tension spring 74 to the pin 75 secured to the walking beam 28.

In order to provide for the desired depth of set of the teeth, despite variations in the linear extending edge of the same, I prefer to employ a depth guaging mechanism which is located so as to be in direct contact with said teeth as particularly shown in Figs. 5, 6 and 7. The main element of such mechanism is the bar 76, which is positioned immediately beneath the plate 14 and which is pivoted at one end to the bolt 77 secured to said plate; the opposite end of said bar contacting with the threaded end 78 of the thumb screw 79 extending through the threaded opening 80 of the ear 81 brazed to the plate 14. As is obvious, the bar 76 can readily be adjusted to and from the anvil 82 by means of said thumb screw 79. Riding upon the said bar 76, and extending above the plate 14, are the brackets 83 and 84, each of which has threaded pairs of legs 83a and 84a extending downwardly through openings 83b and 84b respectively in said plate 14, and secured firmly to said bar as shown; the said openings 83b and 84b being sufficiently ample to provide the desired lateral movement of said legs therein. Attached to the front of each of said brackets 83 and 84 respectively are the face plates 83c and 84c, secured thereto by screws 83d and 84d. It will be observed that by the turning of the thumb screw 79, the face plates 83c and 84c can be adjusted toward or from the anvil 82 to the required depth and with the additional adjustment of the thumb screw 64 (operating to properly space the feed fingers 60c and 61c to make the required contact with every other tooth), the mechanism is made ready to receive and set the teeth of the saw. Thereupon the machinery is started through its connections with the motor as hereinafter set forth, and the toothed edge of the saw manually held by the operator against the face plates 83c and 84c and mechanically fed along until setting is accomplished. By this procedure as is obvious the toothed edge of the saw is kept in constant engagement with the anvil in the required position for setting by the presser foot 47, and thereby any change or variation in the inclination of the teeth or in the linear extension of said edge is eliminated and taken care of.

For the purpose of operatively connecting the running parts of my apparatus to the motor, I mount the pulley 88 upon the outer end of the shaft 19, and connect the said pulley to the pulley 89 of the motor 16 by means of the belt 90. In order to connect or disconnect the said motor, I preferably provide the foot pedal 91, located on the floor below the bench or table 10a, and connect the same by means of the rod 92 to the outer end of the lever 93 pivotally mounted upon one of the uprights 13; the other end of said lever 93 being arranged to form contact with and to raise or lower the bar 94, and the tension spring 95 serving normally to hold said bar in the neutral position shown in the drawings (see Figs. 8 and 9). Preferably the bar 94 is pivotally mounted upon one of the frame bolts 96 of the motor 16, and is provided with the downwardly depending finger 97 shaped to engage with the inside edge of the belt 90 and to throw the same out of contact with the pulley 89.

The operation of my improved apparatus is as follows: The first step is to adjust the desired depth of the set of the teeth of the saw by means of the adjusting screw 79 which is turned to the required position, a position which by careful measurements has been accurately predetermined. Then the lever 46 is released to permit the saw, turned to a horizontal position, to present its teeth for the setting operation by resting the same upon the anvil 82 in the position shown in the drawings (see Fig. 2), and at the same time by bringing the said teeth firmly in contact with the face plates 83c and 84c. Thereupon the first tooth desired to be set is carefully brought in contact with the end of one of the feed fingers 61c as shown in Fig. 7, in which case the saw (on the starting of the motor and establishment of connections) will progress to the left, while the other finger is left in idling position. Should, however, it be desired that the saw be moved to the right, the feed finger 60c should be employed for the purpose, while the feed finger 61c is arranged to be idle, and adjustments made accordingly. One of these arrangements being first accomplished, the belt pulley 88 is preferably turned by hand one complete revolution, whereupon by use of the adjusting screw 64, the feed finger in operation is adjusted to contact the next tooth in alternate progression, and the apparatus is ready for automatic operation. Upon the motor being started, and operative connection being made through the belt 90 with my apparatus, the setting of alternate teeth of the saw will be accomplished without further attention of the operator, except to hold the saw in horizontal position against the face plates and to remove the saw at the end of the operation. Through the progression on one direction of the saw teeth through my apparatus as actuated by feed finger 61c, the alternate teeth protruding from one side of the saw are set by squeezing each tooth down upon the anvil; and through the progression in the opposite direction of the alternate teeth on the opposite side of the saw as actuated by feed finger 60c the setting of the remainder of the teeth in like manner will be automatically completed.

In the claims, by the words "variations in the linear extending edge of the teeth" or language equivalent thereto, I desire to be understood as meaning any elevation, depression, undulation, or change in such edge amounting to any departure no matter how slight from the straight line following such edge whether such departure be lateral or longitudinal of the blade of said saw.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. In a saw setting machine, an anvil to have engaged thereagainst a saw to be set, a rockable beam, a plunger element carried by said beam to engage individual teeth of a saw engaged against said anvil and to deflect and thereby set said teeth in response to rocking movement of said beam, means for rocking said beam, a yoke element rockable by and with said beam, an arm pivoted intermediate its ends for oscillation in a plane at right angles to the plane of rocking movement of said yoke element, a finger on one end of said arm for engagement with a tooth of the saw to advance the latter in response to oscillation of said arm, and a connection including a spreader element between said yoke element and the other end of said arm whereby the latter is oscillated to effect advance of the saw to present a new tooth to be set in response to rocking movement of said beam.

2. A saw setting machine as set forth in claim 1 in which the finger is pivoted to the arm for swinging movement between an operative and an inoperative position relative to the saw teeth, and in which a spring is shiftably engageable in either of two different operative positions with said finger to hold the latter in either an operative or an inoperative position relative to the saw teeth.

3. A saw setting machine as set forth in claim 1 including means adjustable to vary the amount of rocking movement of the yoke element effected by rocking movement of the beam thereby to vary the amount of oscillation of the arm and finger to adapt the latter for cooperation with saw teeth of different lengths.

4. A saw setting machine comprising an anvil to have clamped thereagainst a saw to be set, a beam rockable in a plane at right angles to said anvil, a plunger carried by said beam to engage a tooth of a saw clamped against said anvil and to deflect and thereby set said tooth in response to rocking movement of said beam, means for rocking said beam, a rockable presser foot to engage the saw and clamp the same against said anvil in response to tooth setting rocking movement of said beam, spring means between said beam and said presser foot through which the former acts to cause the latter to yieldably clamp the saw against said anvil, a yoke rockable in a plane at right angles to said anvil, means whereby rocking movement of said beam effects rocking movement of said yoke, a pair of arms one on either side of said yoke pivoted for oscillation in a plane at right angles to the plane of oscillation of said yoke, a finger carried by each arm for engagement with a tooth of the saw to advance the latter in response to oscillation of the related arm, connections between said yoke and said arms whereby rocking of said yoke oscillates said arms, and means for rendering the finger of either arm operative and the finger of the other arm inoperative to effect advance of the saw.

5. In an apparatus for setting saw teeth, a base, an anvil on the base, a rockable beam and a saw clamping device coaxially pivoted to the base; and means for automatically and progressively feeding a saw over said anvil, said means comprising; a yoke also pivoted co-axially with the beam and clamping device and having a transverse web, a bracket carried by the base, an adjusting screw carried by the bracket and engaging said web of the yoke, a pair of levers connected to the base by vertical pivots, spring tensioned feeder fingers carried by the front end of each lever, means for selectively rendering one of said feed fingers operative relative to the teeth of a saw, contractile springs connected to the inner ends of said levers tending to rock the outer ends of said levers carrying the feeder fingers in opposite directions, and spreader links between the outer rear ends of the yoke and the inner sides of said levers for actuating said levers against the tension of said springs.

6. An apparatus for setting the teeth of saws, comprising, in combination, a base, an anvil on the base, a beam pivotally mounted adjacent the anvil and having front and rear ends extending forwardly and rearwardly of its pivotal mounting, means connected to the rear end of the beam for rocking the same on its pivot, a setting plunger carried by the beam for cooperation with said anvil, a clamping device pivoted coaxially with the beam, said clamping device including a presser-foot for positioning a saw on the anvil in operative position to be engaged by the setting plunger, a spring between said presser-foot and the front end of the beam, another spring between the base and the rear portion of the clamping device, said springs tending to rotate the presser-foot toward the anvil, and means on the base operatively connected with said beam for progressively feeding a saw between said presser-foot and the anvil in synchronism with the operation of the setting plunger carried by the beam.

BYRON G. DAGGETT.